(12) United States Patent
Fowler et al.

(10) Patent No.: US 7,642,336 B2
(45) Date of Patent: Jan. 5, 2010

(54) PHTHALONITRILE COMPOSITES

(75) Inventors: Gray E. Fowler, Allen, TX (US);
Emerald J. Adair, Vail, AZ (US);
Michael M. Liggett, Allen, TX (US);
Dong Zhang, Uniontown, OH (US);
Frank W. Harris, Akron, OH (US);
Robert A. Gray, Cincinnati, OH (US)

(73) Assignee: Raytheon Company, Waltham, MA (US)

( * ) Notice: Subject to any disclaimer, the term of this patent is extended or adjusted under 35 U.S.C. 154(b) by 652 days.

(21) Appl. No.: 11/352,841

(22) Filed: Feb. 13, 2006

(65) Prior Publication Data
US 2006/0194944 A1 Aug. 31, 2006

Related U.S. Application Data

(60) Provisional application No. 60/652,501, filed on Feb. 11, 2005.

(51) Int. Cl.
*C08G 63/44* (2006.01)
*C08G 63/00* (2006.01)

(52) U.S. Cl. .................... 528/362; 528/353; 524/607; 524/612; 523/200; 523/222; 427/389.8; 427/385.5; 428/375

(58) Field of Classification Search ................ 528/362, 528/353; 524/607, 612; 523/200, 222; 427/389.8, 427/385.5; 428/375
See application file for complete search history.

(56) References Cited

U.S. PATENT DOCUMENTS

| 4,408,035 A | 10/1983 | Keller |
| 5,242,755 A | 9/1993 | Keller et al. |
| 5,939,508 A | 8/1999 | Keller |
| 6,001,926 A | 12/1999 | Sastri et al. |

FOREIGN PATENT DOCUMENTS

| EP | 0205170 | 12/1986 |
| JP | 1203462 | 8/1989 |
| WO | 99/17928 | 4/1999 |

OTHER PUBLICATIONS

Supplementary European Search Report from corresponding European Application No. EP 06734898.7 mailed Jul. 13, 2009.

*Primary Examiner*—Duc Truong
(74) *Attorney, Agent, or Firm*—Renner, Otto, Boisselle & Sklar, LLP

(57) ABSTRACT

The disclosed compositions and methods for producing composite materials that are suitably adapted for use in elevated temperature environments generally include the use of oxyarylbisorthodinitrile matrix resins in conjunction with aromatic amines to produce an improved phthalonitrile-based composite. Various features and specifications may be controlled, adapted or otherwise optionally modified to improve the temperature-rated performance of the disclosed composite materials. Exemplary embodiments of the present invention generally provide composite materials that offer improved strength at temperatures in excess of 600° F.

24 Claims, No Drawings

PHTHALONITRILE COMPOSITES

RELATED APPLICATIONS

This application claims the benefit of U.S. Provisional Patent Application Ser. No. 60/652,501 filed in the United States Patent and Trademark Office on Feb. 11, 2005 by: Robert A. Gray (Cincinnati, Ohio); Dong Zhang (Akron, Ohio); Gray Fowler (Allen, Tex.); and Frank Harris (Akron, Ohio).

FIELD OF INVENTION

The present invention generally concerns improved composite materials; and more particularly, representative and exemplary embodiments of the present invention generally relate to high-temperature resins and composite materials that employ cyano-addition resins of oxyarylbisorthodinitriles.

BACKGROUND OF INVENTION

Composite materials (often abbreviated as 'composites') are engineered materials made from two or more constituent materials that generally remain separate and distinct on a macroscopic level while forming a substantially unitary component. There are two general categories of constituent materials: matrix and reinforcement. At least one portion (i.e., mass fraction) of each type of material is typically employed. Matrix material generally surrounds and supports the reinforcement material by maintaining the disposition of reinforcement material relative to the matrix material. The reinforcement material generally operates to impart mechanical, electrical and/or physical properties to enhance the properties of the matrix material. A synergy between the matrix and reinforcement material is produced that is otherwise unavailable in homogeneous compositions. The most primitive composite materials may have consisted of straw and mud in the form of bricks for building construction. By way of comparison, advanced composite materials are routinely employed in modern aeronautic and spacecraft design, as well as other applications that require materials capable of performing in demanding conditions and harsh operating environments.

Engineered composite materials must typically be formed to conform to a particular shape. This generally involves manipulation of the reinforcement materials while controlling the matrix properties to achieve a melding event at or near the beginning of the component lifecycle. A variety of fabrication techniques may be employed in correspondence to specific design requirements. These fabrication methods are commonly termed 'molding' or 'casting' processes, as appropriate. Principle factors affecting the manufacturing methodology are the nature of the selected matrix and reinforcement materials. Another parameter is the total quantity of material to be produced.

Many commercially produced composites use a polymer matrix material often referred to as a resin or resin solution. The most common categories of these polymer materials are polyester, vinyl ester, epoxy, phenolic, polyimide, polyamide, as well as others. The reinforcement materials are often fibers, but ground minerals may also be used. Fibers may be woven into a textile material such as a felt, fabric, knit or stitched construction. Additionally, some composite materials employ an aggregate in place of, or in addition to, fibers.

Advanced composite materials generally use carbon fiber reinforcement and epoxy or polyimide matrix materials. These materials have found application as aerospace-grade composites, and typically involve laminate molding at high temperature and pressure to achieve high reinforcement volume fractions. Such advanced composite materials generally provide relatively high stiffness and/or strength:weight ratios. In terms of stress, the fibers generally serve to resist tension while the matrix serves to resist shear—and all materials present generally operate to resist compression.

Conventional bisorthodinitriles (often referred to as phthalonitrile monomers) polymerize to form relatively strong, high-temperature polyphthalocyanine thermosetting resins. Representative examples of bisorthodinitriles that are suitably adapted for producing such resins are disclosed in U.S. Pat. No. 4,056,560; U.S. Pat. No. 4,057,569; and U.S. Pat. No. 4,136,107—all to James R. Griffith and Jacques G. O'Rear.

Phthalonitrile monomers and phthalonitrile polymers of various types are generally described in U.S. Pat. Nos. 3,730,946; 3,763,210; 3,787,475; 3,869,499; 3,972,902; 4,209,458; 4,223,123; 4,226,801; 4,234,712; 4,238,601; 4,259,471; 4,304,896; 4,307,035; 4,315,093; 4,351,776; 4,408,035; 4,409,382; 4,410,676; 5,003,039; 5,003,078; 5,004,801; 5,132,396; 5,159,054; 5,202,414; 5,208,318; 5,237,045; 5,242,755; 5,247,060; 5,292,854; 5,304,625; 5,350,828; 5,352,760; 5,389,441; 5,464,926; 5,925,475; 5,965,268; 6,001,926; and 6,297,298.

The patents referenced vide supra generally teach methods for making and polymerizing phthalonitrile monomers. These monomers typically have two phthalonitrile groups, one at each end of a connecting spacer chain. The monomers may be cured, whereby the cross-linking occurs between cyano groups. These cross-linked networks typically have high thermal and oxidative stability.

Phthalonitrile monomers with aromatic ether oligomeric or polymeric spacer linkages are expected to be useful since they are predicted to have low melting points. Phthalonitrile monomers with a large window between the melting point and the cure temperature are generally desirable to control the rate of curing and the viscosity during the cure.

U.S. Pat. No. 4,259,471 to Keller et al. discloses a phthalonitrile monomer (often referred to as an oxyarylbisorthodinitrile) having a polyphenoxy spacer with from 1 to 10 phenyl groups in the spacer chain. The monomer is made by reacting 4-nitrophthalonitrile with an aromatic diol. The aromatic diol is a phenoxy chain with terminal hydroxy groups. Keller et al. also teaches that, when the polyphenoxy spacer contains one phenyl group, the monomer is the most difficult to cure and the phthalocyanine resin generated is the most rigid and brittle. Resins prepared from monomers with spacers containing 2 to 5 phenyl groups represent the best combination of economy and ease of preparation.

U.S. Pat. No. 6,756,470 to Keller et al. teaches that in bisphthalonitrile compounds containing polyphenoxy spacers, as the length of the polyphenoxy spacer moieties increases, the processing temperature of the phthalonitrile monomer is shifted to lower temperatures. The low melting point allows the monomer to have a lower viscosity at a given temperature than other phthalonitrile monomers. A low viscosity resin generally enables composite processing by resin transfer molding, resin infusion methods and filament winding without heating the curing mix to a temperature that initiates curing. Curing may be initiated when the mixture is in position and need not flow any further. Furthermore, a low melt viscosity and a larger processing window may be useful for fabrication of thick composite sections where the melt must impregnate thicker fiber preforms.

The curing mixture viscosity is a function of both the curing agent concentration and the melt temperature. Accordingly, low melting phthalonitrile monomers and curing agents that do not volatilize at elevated cure temperatures can enhance the processability of phthalonitrile-based composites. This may be desirable since most high temperature resins are not amenable to processing by cost effective methods such as resin transfer molding, resin infusion molding, filament winding and oven cure due to high initial viscosities, the evolution of volatiles during the cure, as well as solvent-related problems.

The generated thermoset has the advantage of desirable thermo-oxidative properties, which may be generally unaffected by the nature of the curing agent. The thermoset also has improved physical properties, such as toughness and processability, relative to systems with a short spacer between the terminal phthalonitrile moieties. Generally, toughness and brittleness are improved with lower cross-link densities. This may be achieved by using phthalonitrile monomers with longer spacer chains. The structural strength of the resins is comparable to that of epoxy and polyimide resins. These resins have many advantages over polyimides due to, for example, the absence of solvents, being less hydroscopic, not being thermoplastic with a low glass-transition temperature, and having better water resistance. U.S. Pat. No. 6,756,470 further teaches that the polyphenoxy spacer in the phthalonitrile should contain at least three phenyl groups

SUMMARY OF THE INVENTION

In various representative aspects, the present invention provides oxyarylbisorthodinitrile composite materials that are suitably adapted for use in elevated temperature environments, as well as methods for producing the same. Exemplary disclosed composite materials employ phthalonitrile matrix resins and aromatic amine curing agents to produce an improved phthalonitrile-based composite material.

Advantages of the present invention will be set forth in the Detailed Description which follows and may be apparent from the Detailed Description or may be learned by practice of exemplary embodiments of the invention. Still other advantages of the invention may be realized by means of any of the instrumentalities, methods or combinations particularly pointed out in the claims.

DETAILED DESCRIPTION OF EXEMPLARY EMBODIMENTS

The following representative descriptions of the present invention generally relate to exemplary embodiments and the inventors' conception of the best mode, and are not intended to limit the applicability or configuration of the invention in any way. Rather, the following description is intended to provide convenient illustrations for implementing various embodiments of the invention. As will become apparent, changes may be made in the function and/or arrangement of any of the elements described in the disclosed exemplary embodiments without departing from the spirit and scope of the invention.

The present invention generally corresponds to the unexpected discovery that certain oxyarylbisorthodinitriles having only one phenyl group in the phenoxy spacer can be relatively easily fabricated into polyphthalocyanine composites that have high strength at elevated temperature (e.g., greater than 600° F.); sufficient toughness to display minimal or no micro-cracking; and a low coefficient of thermal expansion. The disclosed composites may be fabricated using continuous quartz fibers, although other reinforcement materials may be alternatively, conjunctively or sequentially employed.

The disclosed oxyarylbisorthodinitriles are easy to purify and may be prepared using a repeatable synthetic procedure. The composites demonstrate excellent high temperature resistance as well as good strength as measured by the short beam shear test (ASTM D2344). Moreover, the composites may be fabricated using conventional composite processing procedures.

Polymer composites in accordance with exemplary embodiments of the present invention generally employ bisorthophthalonitriles in combination with, for example, a fibrous reinforcement. A method for manufacturing polymer composite materials, in accordance with a representative aspect of the present invention, generally involves providing a fiber-reinforced thermoset composite made by a process comprising the representative process steps of:

heating a phthalonitrile monomer to its melt stage;

combining the phthalonitrile monomer in the melt stage with an aromatic amine curing agent to form a prepolymer mix;

heating the prepolymer mix at a temperature greater than the melting temperature of the prepolymer mix and equal to or less than about 707° F. (375° C.);

impregnating or coating a fibrous material with the prepolymer mix to form a fiber-containing composition; and continuing to heat the fiber-containing composition at a temperature above the melting point of the prepolymer mix and at or below about 707° F. (375° C.) for a sufficient amount of time to cure the fiber-containing composition in order to form a fiber-reinforced composite, wherein the curing is characterized by an increase in viscosity of the fiber-containing composition and/or by gelation of the fiber-containing composition.

The aromatic amine curing agent may be selected to have the property of being thermally stable and nonvolatile at a temperature up to about 707° F. (375° C.). Additionally, the aromatic amine curing agent may be added to the phthalonitrile monomer in an effective amount to substantially completely cure the fiber-containing composition. The aromatic amine curing agent may contain at least one electron withdrawing substituent that is suitably adapted or otherwise configured to reduce the reactivity of the aromatic amine curing agent with the phthalonitrile monomer.

In accordance with a representative and exemplary embodiment of the present invention, the phthalonitrile monomer may comprise a compound of the formula:

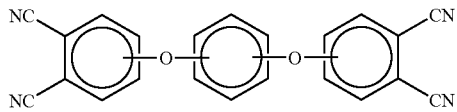

Examples of such a matrix polymer resin material may include: 1,3-Bis(3,4-Dicyanophenoxy) Benzene (meta-); 1,2-Bis(3,4-Dicyanophenoxy) Benzene (ortho-); and 1,4-Bis (3,4-Dicyanophenoxy) Benzene (para-).

The phthalonitriles of the present invention may be rendered available in purities exceeding 99%. Additionally, a blend of phthalonitriles may be employed. It will be appreciated that the ratio of phthalonitrile components may be optionally adjusted, for example, to achieve a particular melt temperature of the prepolymer mix.

The curing agent may comprise any curing agent (whether now known or otherwise hereafter described in the art) that may be useful for promoting the polymerization of the phthalonitrile monomer under reactive conditions, such as elevated temperatures above the melting point of the monomer. The curing agent may be generally stable and nonvolatile at elevated temperatures. Representatively, the curing agent may be selected from the group consisting of: aromatic amines; phenols; inorganic acids; strong organic acids; metals; metallic salts; as well as combinations thereof. For example, in a representatively preferred embodiment, the curing agent may comprise an aromatic amine.

A B-staged prepolymer may be manufactured by at least partially polymerizing a phthalonitrile monomer (or a mixture of suitable monomers), for example, in the presence of a curing agent. Upon cooling, the B-staged prepolymer may be characterized as a substantially frangible solid that may be pulverized into a powder.

As used herein, the terms "fibers" and "fibrous material" are used interchangeably to generally refer to any type of reinforcing fiber that may be used to create fiber-reinforced composites. Representative examples of suitable fibers and fibrous materials are given in U.S. Pat. No. 4,894,286 and U.S. Pat. No. 5,002,750. In general, suitably adapted fibers may comprise substantially continuous quartz fibers; however, the fibers may alternatively, conjunctively or sequentially comprise carbon fibers, silicon carbide fibers, metal, glass, ceramic, and/or the like. Fibrous material may be obtained in any physical form proving useful for creating fiber-reinforced composites including, for example, woven fabrics, non-woven mats, or tow. The fibrous material may alternatively, conjunctively or sequentially comprise a fibrous preform with a shape corresponding to a particular desired end product.

The steps of impregnating the fibrous material with a phthalonitrile thermoset polymer precursor and of curing the mixture to form a fiber-reinforced thermoset polymer may by carried out by any method (whether now known or otherwise hereafter described in the art) for creating fiber-reinforced thermoset polymers. For example, conventional methods of prepreg consolidation, filament winding, RTM, autoclave, resin transfer molding, and resin infusion molding may be used.

Techniques for making composite structures are described in numerous references, including, for example: Sastri et al., "Phthalonitrile-Carbon Fiber Composites" Polymer Composites, December 1996, Vol. 17, No. 6, pp. 816-822; Sastri et al. "Phthalonitrile-Glass Fabric Composites", Polymer Composites, February 1997, Vol. 18, No. 1, pp. 48-54; Buckley, John D. and Edie, Dan D., ed., Carbon-Carbon Materials and Composites, Noyes Publications, Park Ridge, N.J. (1993); Delmonte, John, Technology of Carbon and Graphite Fiber Composites, Van Nostrand Reinhold Company, New York, N.Y. (1981); Schmidt et al., "Evolution of Carbon-Carbon Composites (CCC)" SAMPE Journal, Vol. 32, No. 4, July/August 1996, pp. 44-50; "Expanding Applications Reinforce the Value of Composites" High Performance Composites 1998 Sourcebook; U.S. Pat. No. 3,914,395 to Finelli et al.; U.S. Pat. No. 4,178,413 to DeMunda; U.S. Pat. No. 5,061,414 to Engle; U.S. Pat. No. 4,554,024 to Zimmer et al.; and U.S. Pat. No. 5,686,027 to Olsen et al.; and U.S. Pat. No. 5,744,221 to Crane et al.

As used herein, the term "impregnating" (as it relates to reinforcement materials) means at least partially saturating the reinforcement material with the phthalonitrile thermoset polymer precursor, such as is typically done in conventional methods of resin transfer molding and resin infusion molding, or other known methods. Generally, the step of curing the mixture of a reinforcement material and a phthalonitrile thermoset polymer precursor will include heating the mixture to a temperature at or below about 707° F. (375° C.). Additionally, the cure might, for convenience, be conducted in two or more steps; such as an initial cure, followed by a post-cure in air or in an inert atmosphere, such as nitrogen.

Typical processes that may be employed include vacuum bag with autoclave, resin transfer molding, filament winding using tow impregnation, wet wind, powder impregnation, resin infusion using film or dry powder, transfer molding, compression molding, and pultrusion. The present invention is also generally compatible with available composite equipment and processing materials, including: bagging films; tapes; bleeders; breathers; vacuum hoses; and mold releases.

One method of preparing neat polyphthalocyanines from bisorthodinitriles is to heat the bisorthodinitrile at temperatures from about 400° F. (204° C.) to about 707° F. (375° C.). The atmosphere may be oxygen containing, inert or under vacuum. The heating may continue until the melt solidifies to relatively hard material. A representative method of preparation comprises heating a bisorthodinitrile to about 400° F. (204° C.) and then slowly raising the temperature from about 260° C. to about 275° C. After melting, the viscosity will generally begin to increase due to the onset of phthalocyanine formation, which is generally termed the 'B-stage'. At the B-stage, the material may be cooled to a substantially frangible solid and may be stored indefinitely without further reaction. The B-stage resin may be heated at a temperature from about 204° C. to about 375° C. A preferred cure for any particular resin at a particular temperature may be determined empirically by testing the structural strength of samples over a range of given cure times.

If a metal or salt is used, the polymerization temperature may be reduced from about 10° C. to about 20° C. without substantially affecting the polymerization rate. For example, if stannous chloride is added, the polymerization temperature may be reduced by about 40° C. without affecting the polymerization rate. However, such a procedure is not generally preferred, since with the exclusion of metals and/or salts, the matrix system is simpler. High temperatures generally require a relatively high degree of purity due to the increased reactivity of all species present, including impurities. For example, metal oxides at temperatures above 280° C. may attack the benzene-ring structure. Representatively preferred concentrations of impurities are less than 100 ppm; however, impurities may be present in amounts up to about 800 ppm without noticeably affecting the quality of the final resin. If employed, the dispersion of the salt or metal may be affected by the particle size. Since the resin is generally formed at such high temperatures, dispersion becomes particularly critical. Consequently, particle sizes up to 1000 micrometers may be preferred.

Examples of the preparation of bisorthodinitriles in accordance with the present invention are provided herein. These examples are given by way of representative descriptions of exemplary embodiments and are not meant to limit the disclosure or the claims in any manner.

Example I

SYNTHESIS OF 1,3-BIS(3,4-CYANOPHENOXY) BENZENE (CAS#72452-47-2)

To a 250 ml three necked round bottom flask equipped with a magnetic stirrer, a thermometer, a dean-stark trap and a condenser were charged with resorcinol (5.00 g, 45.4 mmol), 4-nitrophthalonitrile (15.8 g, 91.3 mmol), potassium carbonate (10.0 g, 72.4 mmol), DMF (40 ml) and toluene (40 ml). After the reaction system was swept with nitrogen/vacuum three times, the mixture was heated to 90° C. and vacuum was applied to maintain refluxing of the reaction mixture. Water was removed by azeotropic distillation, followed by removal of toluene once no water was formed. The reaction mixture was cooled to room temperature and poured into water. The precipitate formed was collected and washed with water, dilute HCl aqueous solution and water several times, then with methanol. The solid was recrystallized from the mixture of DMF and water to form yellow crystals 14.7 g (yield 89.1%). The product was dissolved in acetone and decolorized with carbon black to form white crystals, Mp: 185° C. (DSC).

Example 2

Production of Composite Material

Phthalonitrile was placed in a glass beaker and melted at 375° F. Once liquid, the material was degassed and agitated under a 1 mmHg vacuum or greater. M-APB amine catalyst was melted at 350° F. in a separate container and degassed under a 1 mmHg vacuum or greater. The phthalonitrile was then blended with the M-APB amine at a ratio of 100:2.5 pbw. This mixture was then place under 1 mmHg vacuum at 375° F. for approximately 5 minutes. Woven quartz fiber fabric was then pre-impregnated at 375° F. using a hot melt, solvent-less method. The hot catalyzed phthalonitrile may also be adapted to solvent impregnate the quartz fabric, but the solvent would generally need to be removed prior to laminate cure and consolidation.

Layers of the pre-impregnated quartz fabric were layed up in layers to achieve final part thickness. Generally, a quasi-isotropic lay-up of the fiber orientation is desired. The pre-impregnated lay-up was then vacuum bagged using FLUORPEEL TEFLON coated glass bleeder and high temperature nylon bagging film. The lay up was cured in an autoclave with temperature ramping to 400° F. at 2-5° F./minute. At 200° F., 80-85 psi of autoclave $N_2$ pressure was applied. The part was then cured at 400° F. for 12 hours and 80 psi $N_2$.

The laminate was then post cured in an $N_2$ oven. The oven was temperature ramped to 450° F. at 2-5° F./min with a two hour soak at temperature. The oven was then ramped to 615° F. with a 6 hour soak. The oven was then ramped to 715° F. with an 8 hour soak. The composite laminate phthalonitrile/quartz panel was then cut up into short beam shear (SBS) samples using a diamond wafer saw to prevent damage, per ASTM D2344. The SBS were tested per ASTM D2344 at various temperatures including 77° F., 600° F., 800° F., 850° F., 900° F. and 950° F. The results of the evaluation demonstrated the dramatically improved shear strength of the phthalonitrile composite material, in accordance with an exemplary embodiment of the present invention, at temperatures in excess of 600° F. For example, a composite prepared by this procedure from an oxyarylbisorthodinitrile having more than one phenyl group in the phenoxy spacer demonstrated a strength of 1.2 Kg/inch$^2$ at 800° F., while a phthalonitrile resin system, in accordance with an exemplary embodiment of the present invention, demonstrated a strength of 2.7 Kg/inch$^2$ at the same temperature.

Exemplary phthalonitrile resins produced in accordance with various representative embodiments of the present invention may be used in aerospace, chemical, electrical, space, marine, medical, missile, and industrial applications. The disclosed phthalonitrile resins may be fabricated into high-temperature composite structures by any process, whether now known or otherwise hereafter described in the art, such as, for example: autoclave molding; compression molding; resin transfer molding (RTM); vacuum assisted resin transfer molding (VARTM); and/or the like. The phthalonitrile polymer materials of the present invention may be used to make high-temperature adhesives, coatings, molding compounds, powders, prepregs, solutions, towpregs, tackifiers; and/or the like.

In the foregoing specification, the invention has been described with reference to specific exemplary embodiments; however, it will be appreciated that various modifications and changes may be made without departing from the scope of the present invention as set forth in the claims below. The specification is to be regarded in an illustrative manner, rather than a restrictive one and all such modifications are intended to be included within the scope of the present invention. Accordingly, the scope of the invention should be determined by the claims appended hereto and their legal equivalents rather than by merely the examples described above.

For example, the steps recited in any method or process claims may be executed in any order and are not limited to the specific order presented in the claims. Additionally, the components and/or elements recited in any composition or apparatus claims may be assembled or otherwise operationally configured in a variety of permutations to produce substantially the same result as the present invention and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

As used herein, the terms "comprising", "having", "including" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

We claim:

1. A method for producing a composite material suitably adapted for use in elevated temperature environments, said method comprising the steps of:
providing a phthalonitrile monomer selected from the group consisting of:

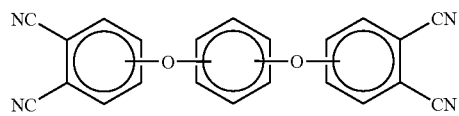

heating said phthalonitrile monomer to its melt stage;
combining said phthalonitrile monomer with a curing agent to form a prepolymer mix;
heating the prepolymer mix to a temperature at least greater than the melt temperature of said prepolymer mix;

at least one of impregnating and coating a reinforcement material with said prepolymer mix to produce a composite material; and heating said composite material to a temperature of at least greater than the melt temperature of said prepolymer mix for a sufficient time to cure said composite material.

2. The method of claim 1, wherein said phthalonitrile monomer comprises at least one of: 1,3-Bis(3,4-Dicyanophenoxy) Benzene; 1,2-Bis(3,4-Dicyanophenoxy) Benzene; and 1,4-Bis(3,4-Dicyanophenoxy) Benzene.

3. The method of claim 1, wherein said curing agent comprises an aromatic amine.

4. The method of claim 3, wherein said curing agent is at least one of thermally stable and nonvolatile at a temperature of up to about 375° C.

5. The method of claim 3, wherein said curing agent is added to said phthalonitrile monomer in an effective amount to substantially cure said composite material.

6. The method of claim 3, wherein said curing agent comprises at least one electron withdrawing substituent suitably adapted to at least partially reduce the reactivity of said aromatic amine curing agent with said phthalonitrile monomer.

7. The method of claim 1, wherein said heating of said prepolymer mix comprises heating to a temperature of up to about 375° C.

8. The method of claim 1, wherein said heating of said composite material comprises heating to a temperature of up to about 375° C.

9. The method of claim 1, wherein said reinforcement material comprises at least one of a fibrous material, a mineral material and an aggregate material.

10. The method of claim 1, wherein curing of said composite material is characterized by at least one of an increase in viscosity and gelation of said composite material.

11. A composite material suitably adapted for use in elevated temperature environments, said composite material produced in accordance with a process comprising the steps of:

providing a phthalonitrile monomer selected from the group consisting of:

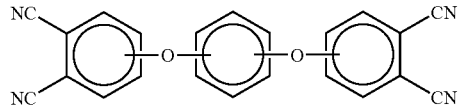

heating said phthalonitrile monomer to its melt stage;
combining said phthalonitrile monomer with a curing agent to form a prepolymer mix;
heating the prepolymer mix to a temperature at least greater than the melt temperature of said prepolymer mix;
at least one of impregnating and coating a reinforcement material with said prepolymer mix to produce a composite material; and
heating said composite material to a temperature of at least greater than the melt temperature of said prepolymer mix for a sufficient time to cure said composite material.

12. The composite material of claim 11, wherein said phthalonitrile monomer comprises at least one of: 1,3-Bis(3,4-Dicyanophenoxy) Benzene; 1,2-Bis(3,4-Dicyanophenoxy) Benzene; and 1,4-Bis(3,4-Dicyanophenoxy) Benzene.

13. The composite material of claim 11, wherein said curing agent comprises an aromatic amine.

14. The composite material of claim 13, wherein said curing agent is at least one of thermally stable and nonvolatile at a temperature of up to about 375° C.

15. The composite material of claim 13, wherein said curing agent is added to said phthalonitrile monomer in an effective amount to substantially cure said composite material.

16. The composite material of claim 13, wherein said curing agent comprises at least one electron withdrawing substituent suitably adapted to at least partially reduce the reactivity of said aromatic amine curing agent with said phthalonitrile monomer.

17. The composite material of claim 11, wherein said heating of said prepolymer mix comprises heating to a temperature of up to about 375° C.

18. The composite material of claim 11, wherein said heating of said composite material comprises heating to a temperature of up to about 375° C.

19. The composite material of claim 11, wherein said reinforcement material comprises at least one of a fibrous material, a mineral material and an aggregate material.

20. The composite material of claim 11, wherein curing of said composite material is characterized by at least one of an increase in viscosity and gelation of said composite material.

21. In a method for producing a composite material suitably adapted for use in elevated temperature environments, the improvement comprising the step of providing a matrix resin material comprising a phthalonitrile monomer selected from the group consisting of:

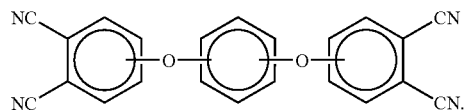

22. The method of claim 21, further comprising the step of providing a curing agent that comprises at least one electron withdrawing substituent suitably adapted to at least partially reduce the reactivity of said curing agent with said phthalonitrile monomer.

23. The method of claim 21, further comprising the step of providing a curing agent that comprises an aromatic amine.

24. The method of claim 23, wherein said curing agent comprises at least one electron withdrawing substituent suitably adapted to at least partially reduce the reactivity of said curing agent with said phthalonitrile monomer.

* * * * *

UNITED STATES PATENT AND TRADEMARK OFFICE
CERTIFICATE OF CORRECTION

| | |
|---|---|
| PATENT NO. | : 7,642,336 B2 |
| APPLICATION NO. | : 11/352841 |
| DATED | : January 5, 2010 |
| INVENTOR(S) | : Fowler et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 969 days.

Signed and Sealed this

Sixteenth Day of November, 2010

David J. Kappos
*Director of the United States Patent and Trademark Office*